Sept 10, 1957          R. C. BAKER          2,805,568
PNEUMATIC GAUGING DEVICE
Filed April 23, 1954          2 Sheets–Sheet 1
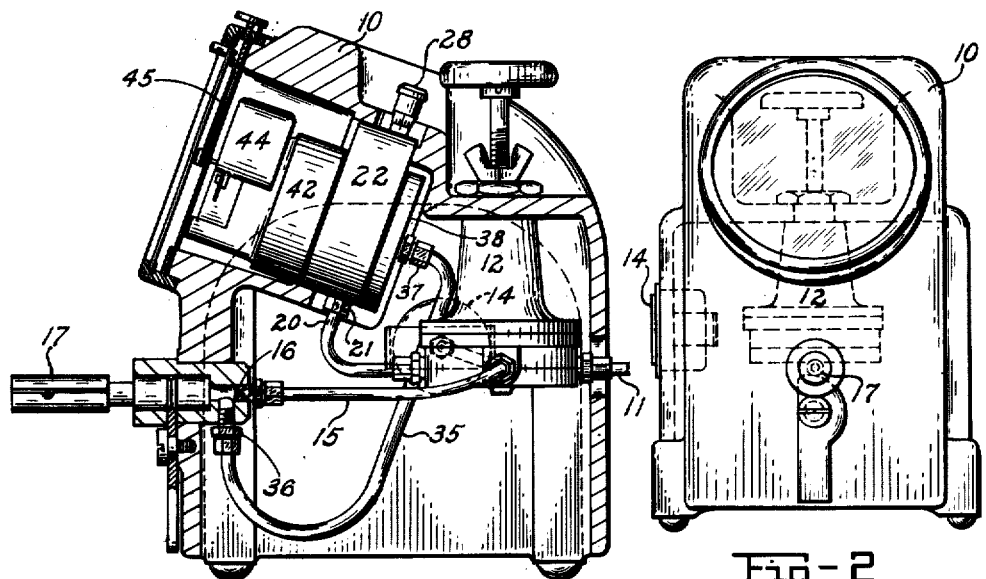
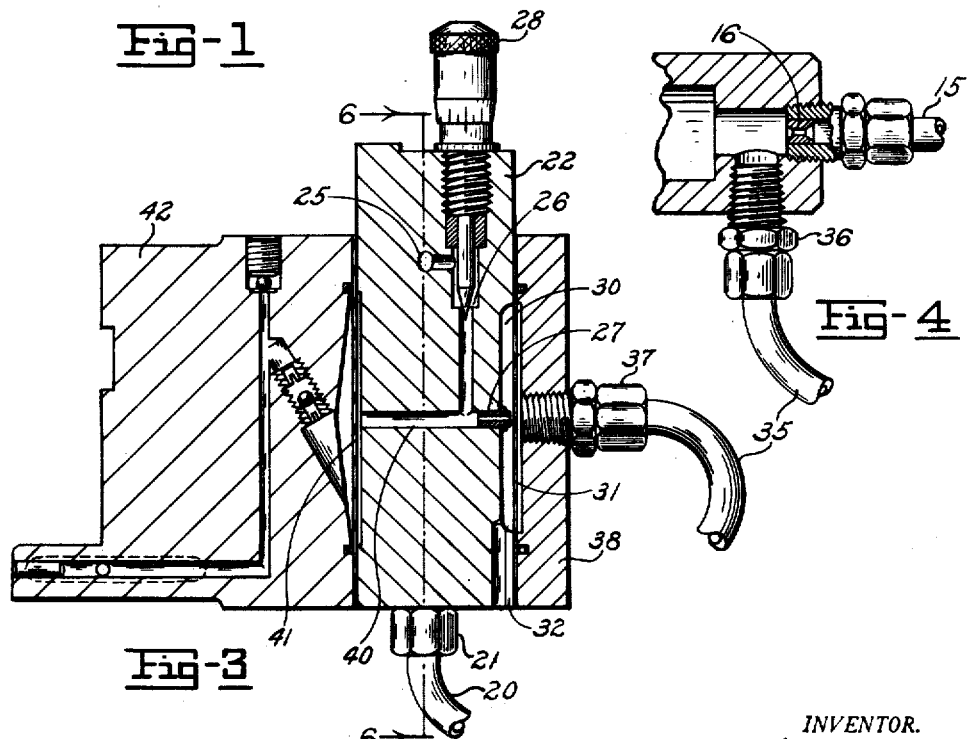
INVENTOR.
Ralph C. Baker
BY Edward J. Noig
atty.

Sept 10, 1957    R. C. BAKER    2,805,568
PNEUMATIC GAUGING DEVICE
Filed April 23, 1954    2 Sheets-Sheet 2

PRESSURE

TOTAL-WORK-CLEARANCE

INVENTOR.
Ralph C Baker
BY Edward J. Noif
atty.

United States Patent Office 2,805,568
Patented Sept. 10, 1957

2,805,568
PNEUMATIC GAUGING DEVICE

Ralph C. Baker, Dayton, Ohio, assignor, by mesne assignments, to The Sheffield Corporation, a corporation of Ohio Application April 23, 1954, Serial No. 425,208

3 Claims. (Cl. 73—37.9)

This invention relates to a gauging apparatus and more particularly to an apparatus in which a flow of fluid is employed in gauging a product characteristic such as the size of an article.

One object of this invention is to provide a gauging apparatus wherein fluid pressure changes are obtained in accordance with a gauged product characteristic and including means for amplifying such pressure changes to provide a linear response through a predetermined portion of the characteristic response of the fluid pressure changes, the apparatus comprising a simplified dial indicating gauging system involving a small number of components and a reduced number of adjustments.

It is a further object to provide a gauging instrument in which an indicator has an amplified linear response to changes in the total distance between the work and the orifices in a gauging head and in which this total distance can be much larger than has been heretofore possible in high amplification gauging.

It is a further object to provide a gauging apparatus having a single regulator providing a source of fluid under controlled pressure supplying a pair of branch passages with fluid at the same pressure, one of said passages providing a gauging branch and the other of said passages providing an amplifying branch responsive to the gauging pressures within the gauging branch, one of said passages including a fixed restriction and the other a manually adjustable restriction whereby the appartus can be simply adjusted and economically constructed.

It is a further object to provide a gauging apparatus of the type referred to wherein the flow through an orifice is controlled by the clearance between the work and orifice and is gauged by means of a pressure responsive system which includes gauging means responsive linearly to the gauging pressures through an amplified response range which includes the tolerance range of the characteristic being gauged but which is not sensitive through a predetermined substantial initial orifice clearance range whereby the outlet of the orifice can be situated in well depressed relationship relative to the adjacent surfaces of the associated gauge head or with respect to the work fore more accurate gauging through a longer service life regardless of gauge head wear, dirt accumulation and the like.

Figures 5, 6:
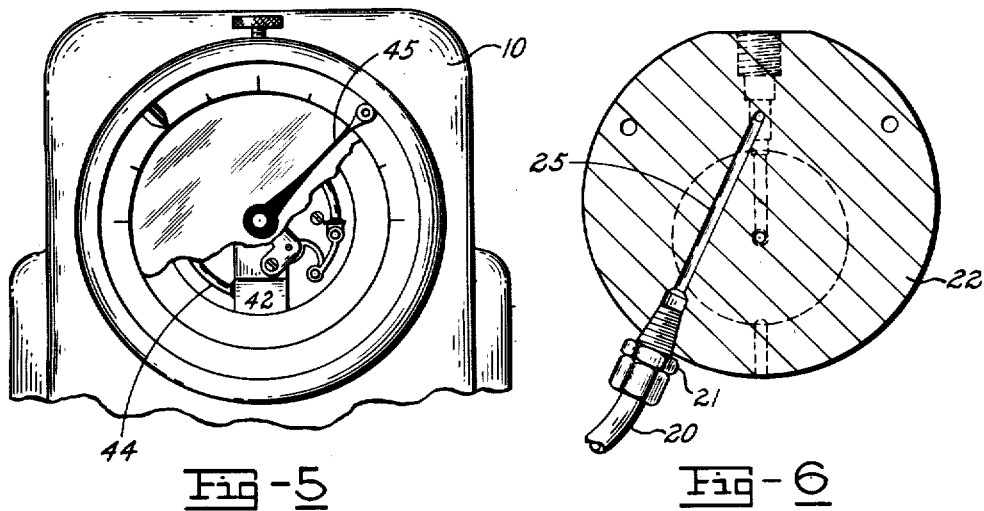
Figure 8:
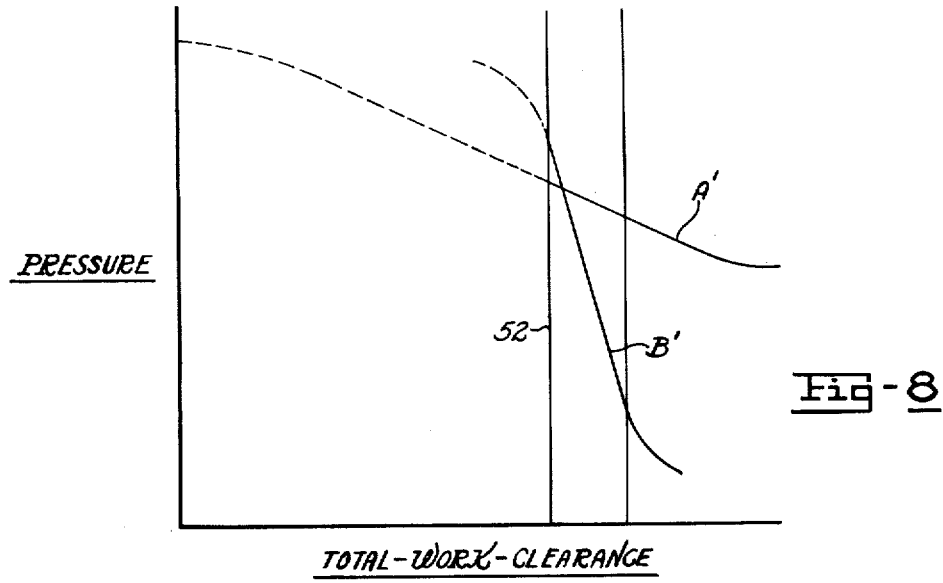
Figure 7:
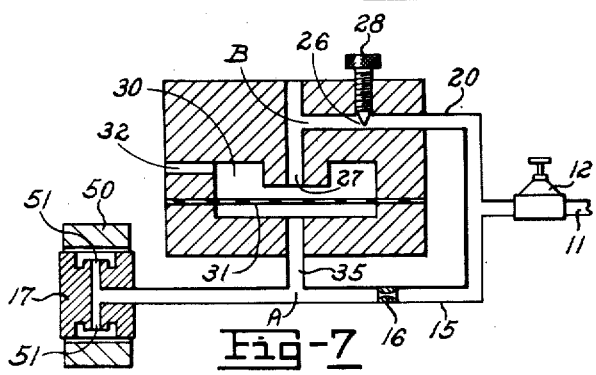

Other objects and advantages of the invention will be apparent from the following description, the appended claims and the accompanying drawings in which, Figure 1 is a vertical central section of an apparatus embodying the present invention, Figure 2 is a front view of the apparatus of Figure 1, Figure 3 is a central section of the primary gauging components of the apparatus, Figure 4 is an enlarged fragment of the section of Figure 3, Figure 5 is a view taken perpendicular to the dial face of the apparatus with a portion of the face broken away, Figure 6 is a sectional view on the line 6—6 of Figure 3, Figure 7 is a schematic diagram illustrating the basic gauging system, and Figure 8 is a graph showing the relationship of the pressures at two points in the apparatus relative to the total work to orifice clearance.

The exemplary apparatus illustrated for the purpose of disclosing the features of this invention is one in which the air escaping from a gauging head is controlled by the size of an article and resulting pressure changes are employed in gauging. It will be apparent that the use of the apparatus is not so restricted and that the apparatus would have application in gauging other product characteristics.

In the particular apparatus illustrated air is supplied from a common regulated source and at the same pressure to two branch circuits which cooperate for gauging. A first of these branches leads through a restriction to the gauging head orifice or orifices. As shown there is a pair of diametrically opposed open orifices in the gauging head. A gauging pressure is obtained in this branch beyond the restriction which varies with the leakage through the orifices as controlled by the clearance of the work relative to the orifices. The second of these branches leads through a restriction and exhausts to atmosphere through an open orifice. A flexible diaphragm responsive to the gauging pressures is carried in opposed controlling relationship to this orifice. The diaphragm functions to produce amplified pressure changes in the second branch upstream of the orifice, as will be more fully described, and these amplified pressure changes are applied to actuate an indicating pointer, switches or the like.

The gauging pressure in the first or gauging branch will decrease with increasing orifice clearances through a characteristic response curve having a linear central portion. The diaphragm will have a corresponding movement. The orifice at the terminus of the second or amplifying branch is so situated relative to the diaphragm as to be effectively controlled thereby during only a portion of the linear response range of the gauging pressures and at the larger total orifice clearances. By such an arrangement amplified pressure changes are obtained for actuating the pointer of a dial indicator, for example, through a linear range commencing at a substantial orifice clearance and including the work tolerance. This makes possible advantageous arrangements in gauging including the disposition of the gauging head orifices substantially depressed or "undercut" relative to the adjacent surfaces of the gauging head for accurate gauging through a long service life regardless of gauge head wear, dirt accumulations or the like. This apparatus makes high amplification gauging possible with large orifice undercuts. Problems of balanced flow through a plurality of orifices in gauging are also minimized.

In the gauging apparatus shown all gauging components are supported by a cast housing 10. Air is supplied for gauging from a suitable pressure source through a conduit 11 connected to a regulator 12. The regulated pressure is indicated by pressure gauge 14 mounted in one wall of the housing.

Air flows from the regulator through a conduit 15 and a fixed restriction 16 to a gauging head 17. As shown, the gauging head 17 comprises a pair of opposed orifices for gauging the internal diameter of a hole in a part. Air escaping through these orifices will be controlled in accordance with the diameter of the hole and the gauging pressure beyond the fixed restriction 16 will respond to the fluid leakage and the total orifice clearance. This circuit constitutes a primary gauging branch of the overall gauging circuit illustrated.

Air is also led from the regulator 12 through a conduit 20 to a connection 21 in a side of an orifice block 22. From this connection 21 air passes along passage 25 (see Figure 6), past an adjustable restriction as indicated at 26 and to an open orifice or nozzle 27. The restriction 26 is manually adjusted by means of knob 28. Air escapes through orifice or nozzle 27 into a chamber 30 one wall of which is formed by a flexible diaphragm 31. The diaphragm is formed by a suitable flexing member such as a bellows or a disc as illustrated. Air exhausts from the chamber 30 to atmosphere through a passage 32. A conduit 35 connects at 36 to the gauging branch at a point downstream of the fixed restriction 16 and at its other end this conduit 35 connects at 37 to an end plate 38 which forms a chamber sealed relative to the diaphragm 31. Through this conduit 35 the gauging pressure existing in the gauging circuit is applied to the diaphragm 31 to cause it to flex and control the flow escaping through nozzle 27. This causes amplified pressure changes to take place at a point between the restriction 26 and the nozzle 27. This portion of the system constitutes an amplifying branch for obtaining amplified pressure changes responsive to the gauging pressures.

The amplified pressure changes are effective through a passage 40 in orifice block 22 and act upon the righthand side of a diaphragm 41 as it is viewed in that figure. The flexures of diaphragm 41 in response to the amplified pressure changes are effective through the passages of a mounting block 42 to move an expansible chamber. As shown this expansible chamber is a Bourdon tube 44. Preferably both the Bourdon tube 44 and the passages in block 42 are completely filled with liquid down to diaphragm 41. The Bourdon tube 44 is effective through a suitable mechanical drive shown in fragment in Figure 5 to move or rotate an indicating pointer 45 along a calibrated dial.

In order to disclose the features of this invention its functions in the specific illustrated application will now be described; however, it will be apparent to those skilled in the art that this invention will have various applications in gauging product characteristics. In Figure 7 the gauging head 17 is shown in association with a workpiece or part 50 which has a cylindrical hole therethrough. The association of orifice outlets 51 with the workpiece 50 is also shown. It will be noted that the outlets of orifices 51 are situated in a substantially depressed relationship relative to the surface of the gauging head 17. In other words, the orifice outlets are "undercut" relative to the surface of the gauging head. It will also be noted that the workpiece 50 has some clearance relative to the adjacent surface of the gauging head 17. If the gauging head 17 is centrally aligned with the hole through the workpiece 50 this clearance would be equal on each side of the gauging head.

The obtaining of a great amount of orifice undercut is extremely important in gauging. If the orifice can be situated with a substantial undercut the gauging head can perform its gauging function through a long service life without its accuracy being affected by wear of the gauging head surface or accumulation of dirt, work chips or the like. A substantial amount of undercut is also advantageous in insuring balanced flow through a plurality of orifice outlets regardless of the situation of the gauging head relative to the workpiece.

In previous systems where high amplifications have been obtained the linear range of amplified gauging response has been effective through only a narrow range which begins with a very small minimum total orifice clearance. With the present invention extremely high amplifications are achieved through a linear response range which extends from a substantial orifice clearance and includes the part tolerance range. For example in one high amplification application the present invention will allow an increased orifice undercut from 0.0004 of an inch to 0.003 of an inch.

Total work clearance in the present example would equal the total amount of undercut of both orifice outlets in the gauging head 17 plus the total clearance of the workpiece hole relative to the gauging head at diametrically opposite sides. In each application of such apparatuses the system is designed to be effective in gauging through a range commencing at an initial clearance of the work relative to the gauging head and to include the tolerance range being gauged. In the graph of Figure 8 total work clearance is represented along the horizontal coordinate and resulting pressures along the vertical coordinate. The line A' of this figure plots the pressures existing at A in the gauging branch as they respond to flow through the total clearance of the orifices relative to the workpiece 50. These are also the pressures to which the diaphragm 31 responds and gives an indication of its deflections. The pressure in the amplifying branch at point B is plotted by the curve B' and these are the pressures to which the Bourdon tube 44 responds to actuate pointer 45.

The total work clearance to the line 52 represents the total orifice undercut plus the total minimum work clearance. In one practice example this total clearance is divided so that the total undercut is approximately six times that of the total minimum part clearance. With this minimum total clearance condition in the apparatus, this line 52 will intersect the maximum gauging pressures effective in the apparatus.

When this maximum pressure exists at A the diaphragm 31 will be deflected to the most extreme position it will occupy toward the nozzle 27. With such a deflection the clearance of the nozzle 27 relative to the diaphragm is designed to give the characteristic response curve B' of the pressures at B through an amplified linear response range occupying and responding to only a portion of the linear response range of the pressures at A but lying adjacent the righthand end of the linear response portion of curve A' as viewed in Figure 9. This allows substantial orifice clearances before the linear response of the amplifying circuit becomes effective. If the same amplification could be obtained with a circuit such as that of the gauging branch comprising only the fixed restrictor 16 and the gauging head 17, the curve would slope sharply as does curve B' but would begin at the zero total work clearance point on the graph and the minute initial clearances possible with such arrangements would be obvious.

A minimum number of gauging components is involved in the present system, making it economical to construct and simple to adjust in setup. Only a single regulator is involved which leads to both of the branch circuits and with a fixed restriction in one circuit and only a single variable restriction in the other only two interrelated adjustments are necessary. It has been found in practice that necessary adjustments of the regulator 12 do not materially affect the curve A' of the gauging branch. To adjust the slope of curve B' and the amplification of the apparatus only two interrelated adjustments of the variable restriction 26 through use of knob 28 and an adjustment of the regulator 12 are required. The variable restriction 26 is the primary control of this slope and amplification and the more it is closed or restricted the steeper is the slope of curve B'. The greater the regulated pressure the steeper curve B' becomes. With only a pair of variables involved in the amplification adjustment, an adjustment can be accomplished by an inexperienced operator in a simple manner.

Thus it is seen that a gauging apparatus has been provided involving only a relatively few components and a minimum number of interrelated adjustments. Because of the unique amplifying arrangement and its association with the gauging head extremely high amplifications can be obtained but with substantial minimum orifice clearances, thus providing for increased orifice undercut and work clearance for more accurate gauging through a longer service life and with minimized balance problems.

While the form of apparatus herein described constitutes a preferred embodiment of the invention, it is to be understood that the invention is not limited to this precise form of apparatus and that changes may be made therein without departing from the scope of the invention which is defined in the appended claims.

What is claimed is:

1. A gauging apparatus comprising a regulator, means adapting said regulator for connection to a source of air under pressure, first and second passages connected to and leading from said regulator and supplied with fluid at the same pressure, a restriction in each of said passages, the fluid pressure at the upstream side of the restrictions being the same, means at the terminal end of the first passage adapted for connection to a gauging head having at least one open gauging orifice carried in opposing relationship to the work being gauged whereby a gauging pressure is obtained in the first passage beyond its restriction in accordance with the gauged product characteristic, the gauging orifice being depressed relative to adjacent surfaces of the gauge head to provide a linear gauging range at a larger range of orifice to work clearances, an open leakage control orifice at the terminal end of the second passage exhausting to atmosphere, a diaphragm, means supporting said diaphragm with one side thereof in adjacent opposed relationship to the open leakage orifice, and means placing the other side of said diaphragm in communication with the second passage at a point beyond the restriction therein, whereby flow from the open orifice is controlled in accordance with the flexure of the diaphragm in response to the gauging pressure and amplified pressure changes are obtained in the second passage beyond the restriction, said diaphragm supporting means relatively disposing the diaphragm and leakage orifice to provide amplified linear pressure response in the second passage in response to pressure changes in the first passage through the gauging range, an expansible chamber connected to said second passage and responsive to the pressure changes therein, an indicating means including a calibrated dial and a pointer, means connecting said pointer to said expansible chamber to obtain accurate amplified indications of the gauged product characteristic, the space between the diaphragm and control orifice being such that the expansible chamber and the pointer respond linearly to changes in pressure just ahead of the control orifice throughout the gauging range.

2. A gauging apparatus comprising a regulator, means adapting said regulator for connection to a source of air under pressure, first and second passages connected to and leading from said regulator and supplied with air at the same pressure, a restriction in each of said passages, means at the terminal end of the first passage adapted for connection to a gauging head having at least one open orifice carried in opposing relationship to the work being gauged whereby the gauging pressure in the first passage means beyond the associated restriction has a characteristic response curve through a range of total work to orifice clearances having a linear portion, an open leakage orifice at the terminal end of the second passage exhausting to atmosphere, a diaphragm, means supporting said diaphragm with one side thereof in adjacent opposed relationship to the open leakage orifice, and means placing the other side of said diaphragm in communication with the second passage at a point beyond the restriction therein, whereby flow from the open orifice is controlled in accordance with the flexure of the diaphragm in response to the gauging pressure and amplified pressure changes are obtained in the second passage beyond the restriction therein, said diaphragm supporting means relatively disposing the diaphragm and orifice to provide a range of flow controlling movement therebetween during gauging through only a part of the gauging pressure response curve and in the larger total clearance response portion thereof, an expansible chamber connected to said second passage responsive to the amplified pressure changes therein, an indicating means including a calibrated dial and a pointer, means connecting said pointer to said expansible chamber whereby accurate amplified linear indications are obtained within a range of comparatively large total work to orifice clearances.

3. A gauging apparatus comprising means providing passages adapted for connection to a source of air under pressure, said passages including gauging and amplifying passages, regulator means connected to said passages for controlling the pressure of air supplied thereto, a flow restriction in each of said passages, a gauge head at the terminal end of the gauging passage having at least one open orifice carried in opposing relationship to the work being gauged, the pressure in the gauging passage having a characteristic response to orifice clearance with a linear portion, means on the gauge head providing a substantial minimum orifice to work clearance and restricting effective gauging to the larger linear clearance range of the gauging pressure response, a diaphragm, means in closed communication between the gauging passage and diaphragm subjecting one side of the diaphragm to pressures obtained within the gauging passage, flow control means at the terminal end of said amplifying passage controlled by movement of said diaphragm to provide amplified pressure responses within the amplifying passage, the amplified pressure having a characteristic response to diaphragm movement with a linear portion, support means relatively disposing said diaphragm and said flow control means to obtain a pressure in the amplifying passage adjacent the high pressure end of the linear response portion with substantially the maximum diaphragm deflection obtained in gauging, whereby linear amplified pressure responses are obtained with large minimum work to orifice clearances, and gauging means connected to the amplifying passage and responsive to pressures obtained therein during gauging.

References Cited in the file of this patent

UNITED STATES PATENTS

| 2,166,705 | Hochschultz | July 18, 1939 |
|---|---|---|
| 2,299,884 | Edwards | Oct. 27, 1942 |
| 2,478,391 | Hard Af Segerstad | Aug. 9, 1949 |
| 2,589,251 | Heinz | Mar. 18, 1952 |
| 2,665,579 | Fortier | Jan. 12, 1954 |
| 2,669,246 | Hard Af Segerstad | Feb. 16, 1954 |
| 2,686,424 | Aller | Aug. 17, 1954 |
| 2,706,397 | Byrkett | Apr. 19, 1955 |

UNITED STATES PATENT OFFICE
CERTIFICATE OF CORRECTION

Patent No. 2,805,568                               September 10, 1957

Ralph C. Baker

It is hereby certified that error appears in the above numbered patent requiring correction and that the said Letters Patent should read as corrected below.

In the grant, line 3, and in the heading to the printed specification, line 5, State of incorporation, for "Ohio" read -- Delaware --.

Signed and sealed this 5th day of November 1957.

(SEAL)

Attest:
KARL H. AXLINE
Attesting Officer

ROBERT C. WATSON
Commissioner of Patents